United States Patent [19]
Kodama

[11] Patent Number: 5,908,520
[45] Date of Patent: Jun. 1, 1999

[54] PNEUMATIC RADIAL TIRES WITH ORGANIC FIBER CORD BELT REINFORCING LAYER

[75] Inventor: Tadashi Kodama, Musashimurayama, Japan

[73] Assignee: Bridgestone Corporation, Tokyo, Japan

[21] Appl. No.: 08/296,417

[22] PCT Filed: Dec. 22, 1993

[86] PCT No.: PCT/JP93/01859

§ 371 Date: Aug. 26, 1994

§ 102(e) Date: Aug. 26, 1994

[87] PCT Pub. No.: WO94/14625

PCT Pub. Date: Jul. 7, 1994

[30] Foreign Application Priority Data

Dec. 28, 1992 [JP] Japan .................................... 4-347851
Sep. 20, 1993 [JP] Japan .................................... 5-257664

[51] Int. Cl.⁶ ............................... B60C 9/18; B60C 9/20; B60C 9/22
[52] U.S. Cl. ......................... 152/527; 152/526; 152/531; 152/533
[58] Field of Search .................................... 152/527, 531, 152/533, 536, 526

[56] References Cited

U.S. PATENT DOCUMENTS 4,877,073  10/1989  Thise et al. .......................... 152/531 X
5,115,853   5/1992  Oare et al. ........................... 152/531 X
5,221,384   6/1993  Takahashi et al. ................... 152/531 X
5,407,701   4/1995  Reuter ................................. 152/531 X

FOREIGN PATENT DOCUMENTS 0331501    9/1989  European Pat. Off. .
5-286304  11/1993  Japan ..................................... 152/531

OTHER PUBLICATIONS

European Search Report—Apr. 21, 1995.

*Primary Examiner*—Adrienne Johnstone
*Attorney, Agent, or Firm*—Sughrue, Mion, Zinn, Macpeak & Seas, PLLC

[57] ABSTRACT

The pneumatic radial tire comprises a carcass made of a ply of radially arranged cords toroidally extending between a pair of bead portions, a belt arranged outside the carcass in a radial direction of the tire, and a belt reinforcing layer of organic fiber cords arranged outside the belt in the radial direction of the tire, in which the organic fiber cord constituting the belt reinforcing layer has a strand construction and a twisting coefficient $N_t$ of 0.06–0.30 defined according to the equation.

$$N_t = T \times (0.139 \times D/2\rho)^{1/2} \times 10^{-3} \quad (1)$$

wherein
  T: twisting number (turns/10 cm),
  D: total denier,
  $\rho$: specific gravity (g/cm³).

4 Claims, 6 Drawing Sheets

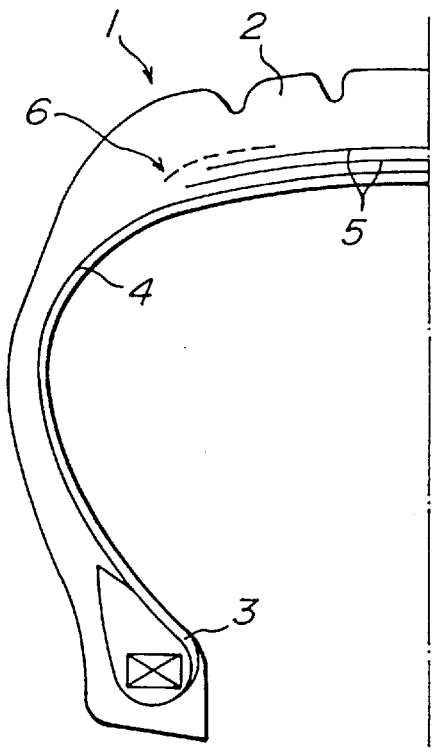
FIG_1
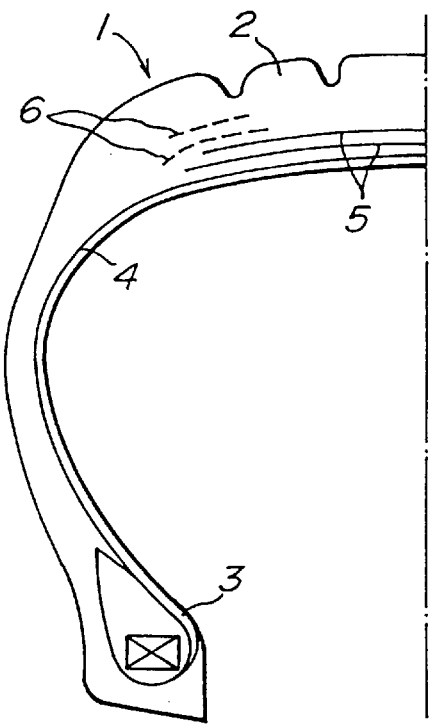
FIG_2

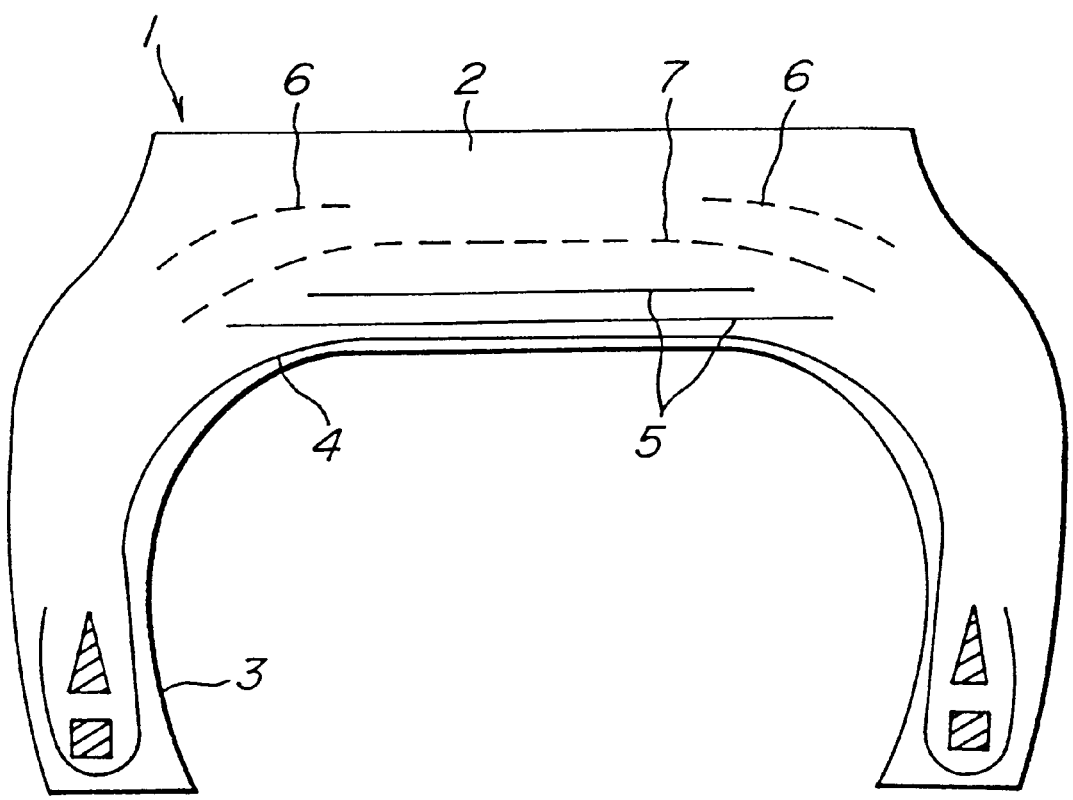

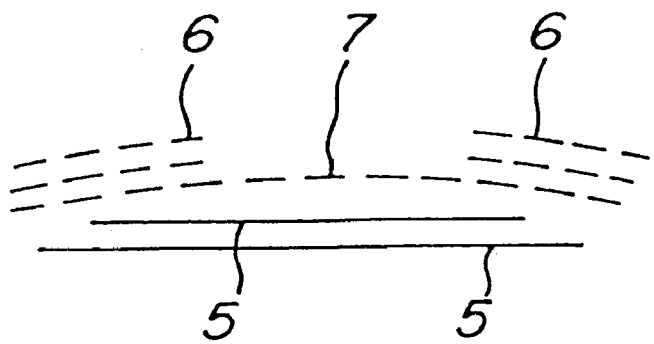
FIG_4A
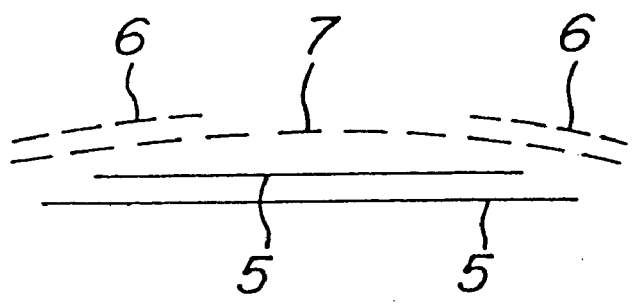
FIG_4B
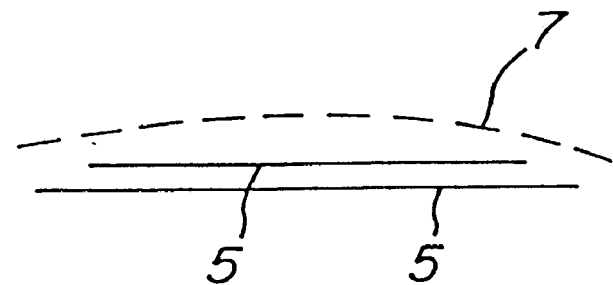
FIG_4C

PNEUMATIC RADIAL TIRES WITH ORGANIC FIBER CORD BELT REINFORCING LAYER

TECHNICAL FIELD

This invention relates to a pneumatic radial tire for use in passenger cars, trucks and buses. More particularly it is directed to improving high-speed durability by improving a belt reinforcing layer.

BACKGROUND ART

In this type of the pneumatic radial tire, it is common that at least two belt layers, each a composite of steel cords arranged at a given inclination angle with respect to an equatorial direction of the tire and coated with rubber, are superimposed on a carcass to form a structure providing steering performance, wear resistance and the like in accordance with vehicle performance.

Recently, the running speed of the vehicle has increased with the advance in the improvement of expressway networks as well as higher output and performance of the vehicle, and it is strongly demanded to improve high-speed durability of a tire accompanied therewith.

For this end, there have been proposed various attempts for improving the high-speed durability of the tire. That is, the pushing-out of tread or shoulder in the tire through centrifugal force acting to the tread portion of the tire during high-speed running, and the formation of a standing wave are serious factors causing trouble for the tire. In order to suppress such a trouble, it is known to add belt reinforcing layer such as a so-called cap, layer or the like to an outside of the belt layer in a radial direction of the tire.

However, it is difficult to completely make up for a shortage of rigidity by a simple addition of the belt reinforcing layer. Consequently, the size growth of the tire in the radial direction during the high-speed running can not be sufficiently suppressed. For this end, it is attempted to improve the rigidity by increasing the number of the belt reinforcing layers. However, the increase of the belt reinforcing layer number increases the rubber thickness to bring about heat build-up or the increase of tire weight, so that the satisfactory high-speed durability can not be obtained.

Furthermore, when using the plural belt reinforcing layers, the dimensional stability of the tire from heat build-up is degraded. Also, the heat build-up becomes large, so that there is caused a problem of lowering the steering stability during running for a long time.

On the other hand, it has been attempted to improve rigidity by increasing an end count of cords embedded in rubber for the belt reinforcing layer. However, as the end count increases, a ratio of cords occupied per unit width in the radial section of the tire or a cord occupying ratio becomes large and a ratio of occupied rubber becomes relatively small. Hence the adhesion property of the cord lowers to induce separation failure or the like and hence there are caused a premature failure of tire and the like.

As compared with these attempts, it is effective to enhance a modulus of elasticity of the cord constituting the belt reinforcing layer. Concretely, it is known to use a high modulus material such as aromatic polyamide (aramid) fiber, polyethylene terephthalate (PET) fiber or the like. As another means, JP-B-59-1601 proposes a method wherein polyamide fibers, polyester fibers or rayon fibers, particularly polyamide fibers are used to form a cord of single twisting structure having a twisting number of 10–40 turns/10 cm and then the resulting cords are used at an end count of 60–300 cords/10 cm in the belt reinforcing layer.

However, when cords of aramid fiber or the like having a low elongation are used as a cord for the belt reinforcing layer, there may be caused tire deformation or cord breakage due to the expansion of the tire during the tire build-up. On the other hand, when the tire expansion during the tire build-up is made small in order to prevent such disadvantages, since the thermal shrinkage of the aramid fiber cord is substantially zero, the cords undesirably move in a zigzag direction during the vulcanization of the tire.

When using the polyester fibers such as PET fiber or the like, since the modulus of elasticity is higher than that of the polyamide fiber, the size growth of the tire is suppressed. If they are used under high-speed running, the heat-resistant adhesion property to other parts of the tire is poor, from which separation failure is easily produced, which results in trouble with the tire.

Moreover, in case of using the single twisted cord is used, since there is a residual torque in the cord itself, the operability is poor in the weaving step and the dipping step with an adhesive, which is easy to produce troubles in tire production. Furthermore, the high-speed durability of the tire cannot be said to be satisfactory even if the twisting number and end count of the cord are defined to given values. Therefore, drastic measures are required.

SUMMARY OF INVENTION

It is an object of the invention to solve the aforementioned problems of the conventional pneumatic radial tires and to provide a pneumatic radial tire having an excellent high-speed durability without damaging other performances.

The inventors have made various studies with respect to the high-speed durability of the tire and realized the guarantee of various performances required in accordance with the high speed and high performances of the vehicle by making the twisting coefficient of the cord in the belt reinforcing layer very small.

That is, the invention lies in a pneumatic radial tire comprising a carcass made of a ply of radially arranged cords toroidally extending between a pair of bead portions, a belt arranged outside the carcass in a radial direction of the tire, and a belt reinforcing layer of organic fiber cords arranged outside the belt in the radial direction of the tire, characterized in that the organic fiber cord constituting the belt reinforcing layer has a strand construction and a twisting coefficient $N_t$ of 0.06–0.30 defined according to the following equation (1):

$$N_t = T \times (0.139 \times D/2\rho)^{1/2} \times 10^{-3} \qquad (1)$$

wherein T is a twisting number (turns/10 cm), D is a total denier and $\rho$ is a specific gravity (g/cm$^3$).

Furthermore, the cord is advantageous in practice to be a residual tension $F_w$ per unit width of the belt reinforcing layer of 80–400 kgf defined according to the following equation (2):

$$F_w = F \times E \times \text{number of self reinforcing layers} \qquad (2).$$

wherein F is a residual tension per one cord in a belt reinforcing layer covering an edge portion of the belt layer immediately after the taking out from the tire, and E is an end count of cords in the belt reinforcing layer covering an edge portion of the belt layer per 5 cm in a widthwise direction of the tire.

And also, the belt reinforcing layer is preferable to have a cord occupying ratio of not more than 65%, and the organic fiber cord is favorable to have a total denier of 1500–4000.

Moreover, the cord occupying ratio is defined by the following equation (3) when the number of cords per unit width (5 cm) or end count is C (cords×5 cm) and the diameter of the cord is D (mm) in the belt reinforcing layer cut in a direction perpendicular to an axial line of the cord embedded in the tire:

$$\text{Cord occupying ratio } (\%) = (D \times C) \div 50 \times 100 \tag{3}$$

The belt reinforcing layer according to the invention serves to reinforce the belt layer and may take various arrangements and structures in accordance with the performances required in the tire. For example, there is known an arrangement shown in FIG. 1. That is, a pneumatic radial tire 1 shown in FIG. 1 is mainly composed of a tread portion 2, a bead portion 3, a carcass ply 2, a belt layer 5 of steel cords of two-layer structure, and a belt reinforcing layer 6 of single layer structure.

The belt reinforcing layer 6 is arranged on the belt layer 5 outward in the radial direction of the tire and at a width corresponding to, for example, 10–40% of the width of the belt layer 5 so as to extend a side edge portion of the belt reinforcing layer to a position of 0–20 mm ranging from the side edge portion of the belt layer 5 toward a shoulder. Moreover, the belt reinforcing layer is formed by spirally winding a narrow-width rubberized strip containing a plurality of the organic fiber cords therein on the belt layer at least one or more times so that these cords are substantially in parallel with the circumferential direction of the tire. Although the belt reinforcing layer of the illustrated embodiment is one layer, it is possible to have a two-layer structure as shown in FIG. 2.

Furthermore, as shown in FIG. 3, the rigidity of the tread portion can be more enhanced by arranging a belt reinforcing layer 7 so as to cover a full width of the belt layer 5 in addition to the belt reinforcing layer 6 covering the side edge of the belt layer 5.

Moreover, the other arrangements of the belt reinforcing layer are shown in FIGS. 4A–4C.

As the organic fiber cord constituting the belt reinforcing layer, use may be made of organic fibers of aliphatic polyamide, aromatic polyamide, polyethylene terephthalate, polyvinyl alcohol and the like. Among them, the aliphatic polyamide fibers are advantageously adaptable. As the aliphatic polyamide fiber, mention may be made of fibers of 6-nylon, 6T-nylon, 6,6-nylon, 4,6-nylon, a copolymer obtained by combining units thereof, a mixture thereof and the like. Among them, the aliphatic polyamide fibers having a ratio of 6,6-nylon unit of 4,6-nylon unit of not less than 80% by weight are preferable. Furthermore, these polyamide fibers can usually be used by compounding with a stabilizing agent composed of copper salt and antioxidant in order to provide the durability to heat, light, oxygen and the like. When such preferable polyamide fibers are used as a cord for the belt reinforcing layer while satisfying the requirements according to the invention, there are not caused tire deformation, cord breakage, zigzag movement and the like as previously mentioned, which is entirely different from the conventional fiber cords, and also the heat-resistant adhesion property to the other parts of the tire becomes good.

Further, the organic fiber cords are preferable to have a total denier (D) of 1500–4000, particularly 1500–2000. When the total denier exceeds 4000, the cord becomes too thick and heat build-up becomes large, and the amount of rubber between the cords increases to increase the rubber thickness and weight of the belt reinforcing layer. However, when the total denier is less than 1500, even if the number of the cords is increased as far as possible, the total modulus of elasticity in the circumferential direction of the tire becomes small and hence sufficient rigidity is not obtained.

There are various twisting structures in the organic fiber cord. The twisting structure according to the invention is favorable to be a strand twisting structure in which cable twist and ply twist are opposite to each other, i.e. cable twist Z/ply twist S or cable twist S/ply twist Z. On the other hand, the single twisting structure is not favorable because there is a residual torque and the operability in the weaving and adhesive dipping steps is poor.

An important feature for improving high-speed durability of the tire according to the invention lies in a novel introduction of a twisting coefficient as a factor into the organic fiber cord for the belt reinforcing layer. The twisting coefficient (Nt) is defined by the aforementioned equation (1) and is within a range of $0.06 \leq N_t \leq 0.30$, preferably $0.15 \leq N_t \leq 0.28$. This twisting coefficient includes a factor of enhancing the modulus of elasticity of the cord. When it exceeds 0.30, the sufficiently high modulus of elasticity is not obtained, while when it is less than 0.06, fatigue resistance is undesirably degraded to easily cause the cord breakage.

As mentioned above, the twisting coefficient is rendered into a very small value of not more than 0.30 to make the modulus of elasticity of the organic fiber cord high and hence the belt reinforcing layer sufficiently develop an effect of suppressing the size growth of the tire in the radial direction during high-speed running or a so-called hoop effect, whereby durability during high-speed running and further steering stability can largely be improved.

In this invention, it is newly found that the residual tension in the organic fiber cord for the belt reinforcing layer in a new tire per unit width of the belt reinforcing layer has a large influence upon tire deformation in the tire production, the high-speed durability of the tire and the like. That is, the residual tension $F_w$ of the organic fiber cord in the belt reinforcing layer per unit width of the belt reinforcing layer is defined by the aforementioned equation (2).

As the residual tension F per cord, when the belt reinforcing layer is two-layer structure, a measured value in an outer layer in the radial direction of the tire, a measured value in an inner layer in the radial direction of the tire, or an average value of these values is used.

In the invention, it is preferable that the residual tension per unit width $F_w$ is 80 kgf $\leq F_w \leq$ 400 kgf, particularly 100 kgf $\leq F_w \leq$ 300 kgf. The residual tension per unit width is calculated from parameters shown in the equation (2), and the residual tension of 80–400 kgf is achieved by selecting the properties of the cord, twisting number, condition of higher tension at adhesive dipping treatment as compared with the conventional one, higher expansion ratio of the belt reinforcing layer before and after the tire vulcanization as compared with the conventional one and the like. When the residual tension per unit width is within the above range, the size growth of the tire during the high-speed running is small and the generating speed of standing wave is suppressed, which gives a good effect to high-speed durability of the tire. When the value exceeds 400 kgf, tire deformation or deformation of the belt layer is apt to be caused in tire production and also a bad influence is produced upon tire uniformity and flat spot. While, when it is less than 80 kgf, the size growth of the tire becomes larger and the satisfactory high-speed durability is not obtained.

According to the invention, the cord occupying ratio defined by the above equation (3) is limited to not more than 65%, which contributes to the improvement of the high-speed durability. That is, when the cord occupying ratio exceeds 65%, the number of the cords per unit width is too large and hence the amount of rubber for ensuring the adhesion property of the cord or between the belt reinforcing layers becomes relatively less, so that the separation failure is apt to be caused and it is difficult to ensure the adhesion property.

BRIEF DESCRIPTION OF DRAWING

FIG. 1 is a left-side half section view of a pneumatic radial tire in which a belt reinforcing layer is one layer;

FIG. 2 is a left-side half section view of a pneumatic radial tire in which a belt reinforcing layer is two layers;

FIG. 3 is a diagrammatically section view of a pneumatic radial tire;

FIGS. 4A, 4B, and 4C are each a schematic view of the belt reinforcing layer;

DESCRIPTION OF THE PREFERRED EMBODIMENTS

The invention will be described with reference to the following examples.

Example I

Tires manufactured according to Table 1 are subjected to a test for high-speed durability.

TABLE 1

|  | Example 1 | Example 2 | Example 3 | Example 4 | Example 5 |
|---|---|---|---|---|---|
| Tire size | 205/60 VR15 | 205/60 VR15 | 205/60 VR15 | 205/60 VR15 | 205/60 VR15 |
| Structure of belt reinforcing layer | FIG. 1 | FIG. 1 | FIG. 1 | FIG. 2 | FIG. 1 |
| Number of layer | 1 | 1 | 1 | 2 | 1 |
| Cord |  |  |  |  |  |
| material | 66-nylon | 66-nylon | 46-nylon | 66-nylon | 66-nylon |
| total denier (D) | 1260 × 2 | 1260 × 2 | 840 × 2 | 1260 × 2 | 1260 × 2 |
| twisting number (T) turns/10 cm | 20 × 20 | 10 × 10 | 25 × 25 | 20 × 20 | 5 × 5 |
| twisting direction (upper/lower) | Z/S | Z/S | Z/S | Z/S | Z/S |
| twisting coefficient ($N_t$) | 0.25 | 0.12 | 0.25 | 0.25 | 0.06 |
| residual tension per cord F (kgf) | 2.0 | 2.2 | 1.9 | 1.5 | 2.3 |
| end count E (cords/5 cm) | 55 | 55 | 65 | 55 | 55 |
| residual tension per width Fw (kgf) | 110 | 121 | 124 | 165 | 127 |
| High-speed durability of tire km/h × minute | 234 × 8 tread chunk out | 234 × 13 tread chunk out | 234 × 18 tread chunk out | 234 × 25 tread chunk out | 234 × 4 tread chunk out |

In Table 1 are shown tire size, structure of belt reinforcing layer and various parameters of cord in the belt reinforcing layer on the pneumatic radial tire of each example.

Moreover, the twisting structure of the cord is a strand twisting structure having a twisting direction shown in Table 1.

The twisting coefficient $N_t$ is calculated according to the above equation (1):

$$N_t = T \times (0.139 \times D/2\rho)^{1/2} \times 10^{-3} \tag{1}$$

wherein T: twisting number (turns/10 cm), D: total denier and ρ: specific gravity (g/cm³).

Furthermore, the residual tension $F_w$ per unit width is calculated according to the above equation (2).

The residual tension F per cord in the belt reinforcing layer is measured as follows.

Figure 5:
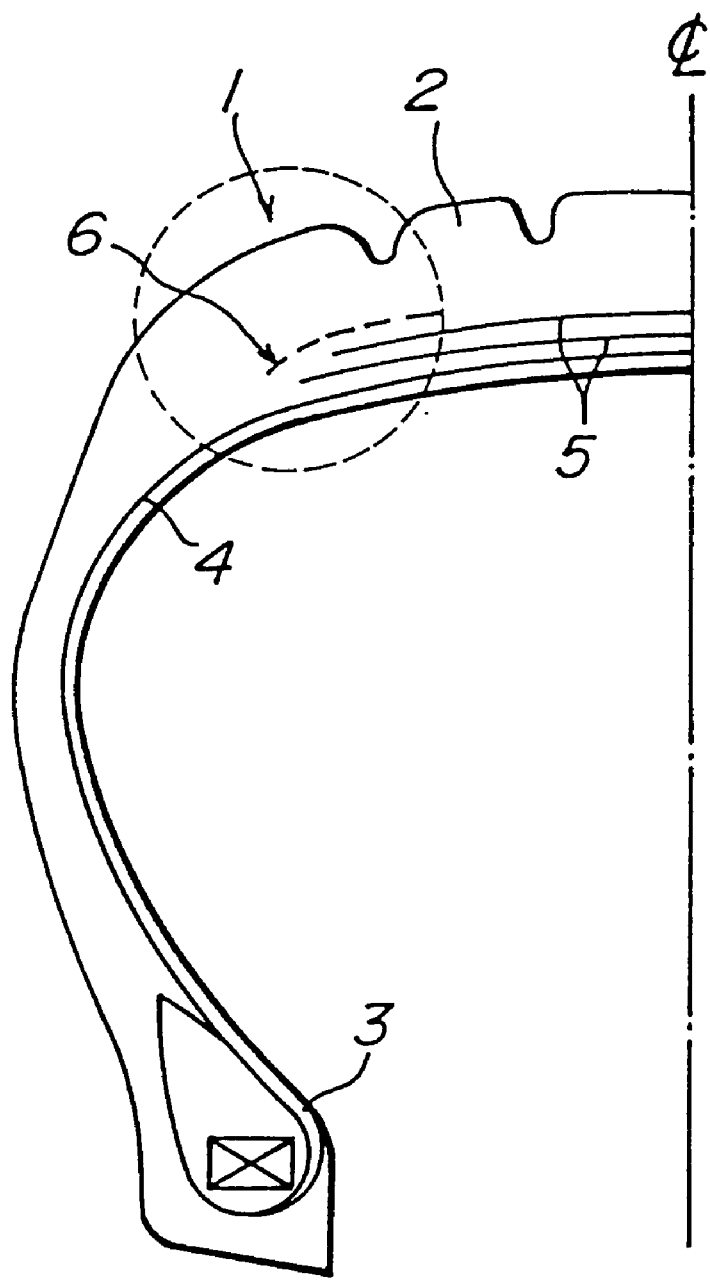
FIG. 5 is a schematically section view of the tire showing a portion for taking a sample for the measurement of residual tension of cord in the belt reinforcing layer.
Figure 6:
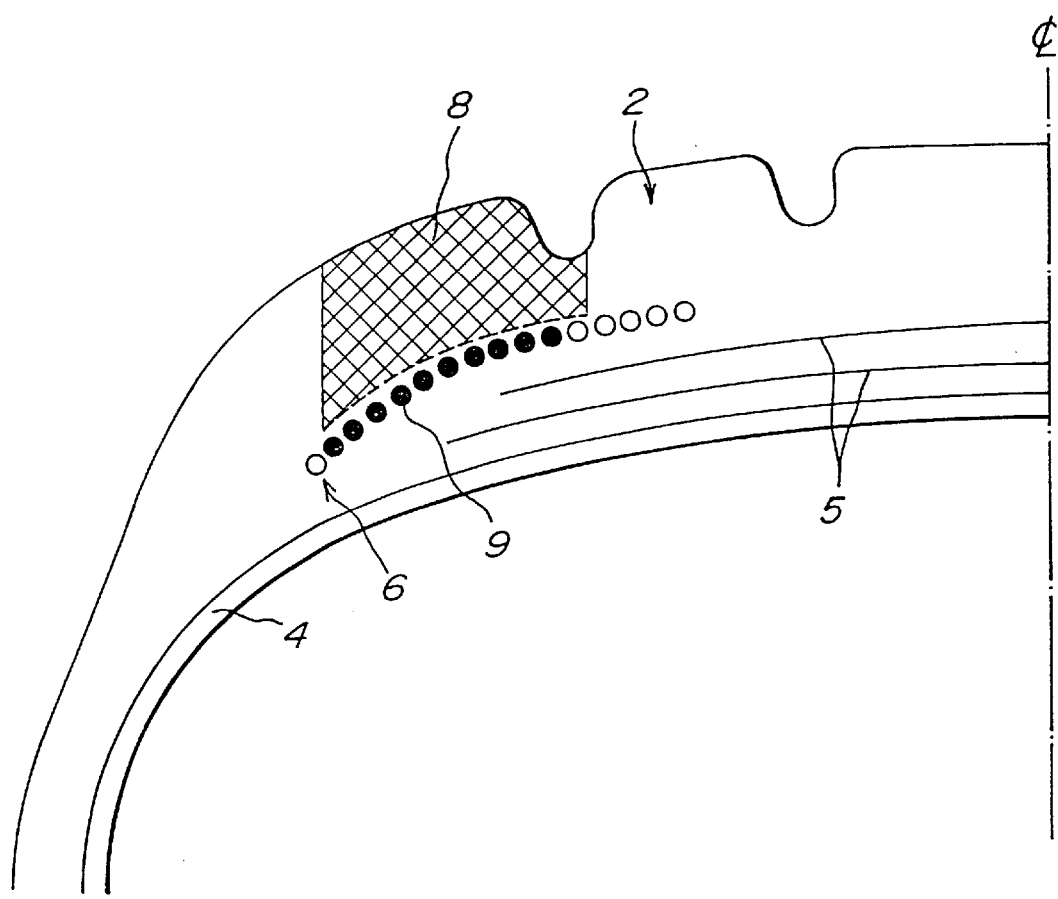
FIG. 6 is an enlarged view of the sample taking portion in FIG. 5.

First, rubber in a shoulder portion of an unused new tire is peeled off to arrive at the vicinity of the cords in the belt reinforcing layer (portion roundly shown by dotted lines in FIG. 5 and a shadowed portion 8 in FIG. 6 showing an enlarged view of the above vicinity). The tire to be tested is a round tire containing no cut pattern on its circumference. Because, the residual tension changes in the cut tire or tire section. In order to conduct an accurate measurement, the peeling operation should be conducted so as not to leave rubber on the cords in the belt reinforcing layer as far as possible and damage the cords. As to 10 cords in total (cords 9 blackened in FIG. 6), a length of 300 mm is accurately measured on the tire and both ends corresponding to such a length are marked. Then, the cords are cut at a position of not less than 200 mm apart from each marked point.

Figure 7:
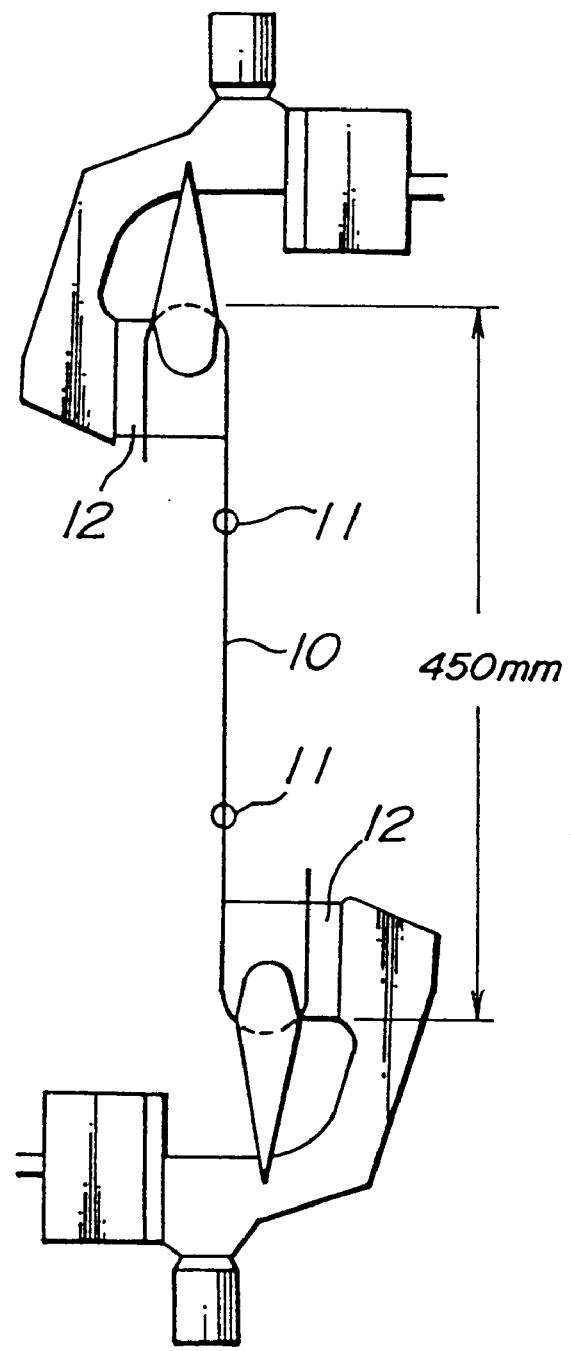
FIG. 7 is a schematic view showing a state of setting the sample immediately after the taking from the tire to an autograph for the measurement of residual tension per cord in the belt reinforcing layer.

Thereafter, each of the cords is taken out to measure the residual tension. In this case, the taken cord rapidly contracts due to the release of residual tension, or if it is left to stand as it is, the cord more contracts due to the influence of humidity in air, so that each sample 10 of the cords immediately after the taking-out from the tire (e.g. within 5 minutes) is set onto chucks 12 having a chuck distance of 450 mm in an autograph (S-500) made by Shimazu Seisakusho shown in FIG. 7 showing a setting state of a sample immediately after the taking-out from the tire. Then, the contracted cord sample 10 is pulled at a rate of 10 mm/min until the distance between marked points 11 turns to an original length of 300 mm, during which a tension is read. An average value of the measured tensions on 10 cords is rendered into residual tension F per cord in the belt reinforcing layer.

For the comparison, tires manufactured according to Table 2 are also evaluated in the same manner as described above.

TABLE 2

|  | Comparative Example 1 | Comparative Example 2 | Comparative Example 3 | Comparative Example 4 | Comparative Example 5 |
|---|---|---|---|---|---|
| Tire size | 205/60 VR15 | 205/60 VR15 | 205/60 VR15 | 205/60 VR15 | 205/60 VR15 |
| Structure of belt reinforcing layer | FIG. 1 | FIG. 2 | FIG. 2 | FIG. 2 | FIG. 1 |
| Number of layer | 1 | 2 | 2 | 2 | 1 |
| Cord |  |  |  |  |  |
| material | 66-nylon | 66-nylon | 66-nylon | 66-nylon | 66-nylon |
| total denier (D) | 1260 × 2 | 840 × 2 | 1260 × 2 | 1260 × 2 | 1260 × 2 |
| twisting number (T) turns/10 cm | 25 × 25 | 47 × 47 | 20 × 20 | 39 × 39 | 20 × 20 |
| twisting direction | Z/S | Z/S | Z/S | Z/S | Z/S |

TABLE 2-continued

|  | Comparative Example 1 | Comparative Example 2 | Comparative Example 3 | Comparative Example 4 | Comparative Example 5 |
|---|---|---|---|---|---|
| (upper/lower) twisting coefficient ($N_t$) | 0.31 | 0.48 | 0.25 | 0.48 | 0.25 |
| residual tension per cord F (kgf) | 1.0 | 0.5 | 4.0 | 2.0 | 0.3 |
| end count E (cords/ 5 cm) | 55 | 65 | 55 | 50 | 50 |
| residual tension per width Fw (kgf) | 55 | 65 | 440 | 200 | 15 |
| High-speed durability of tire km/h × minute | 202 × 25 tread chunk out | 202 × 22 tread chunk out | tire deformation after vulcanization | 210 × 5 tread chunk out | 186 × 5 belt edge separation |

The tire size, structure of belt reinforcing layer and various parameters on the cord of the belt reinforcing layer in the tires of comparative examples are shown in Table 2. Moreover, the twisting structure of the cord is a strand twisting structure having a twisting direction shown in Table 2. The calculation of twisting coefficient $N_t$ and residual tension per unit width $F_w$ is carried out in the same manner as in the examples. Moreover, the value of residual tension per cord F is measured in the outer layer in the radial direction of the tire when the belt reinforcing layer is a two-layer structure (Example 4, Comparative Examples 2, 4 and 5).

Evaluation

The evaluation test of the high-speed durability is conducted with respect to the tire of each example shown in Table 1 and the tire of each comparative example shown in Table 2.

The evaluation for the high-speed durability of the tire is carried out by a step speed system according to a test method of United States standard FMVSS No. 109. That is, the evaluation is carried out by increasing the speed every 30 minutes until the occurrence of trouble, during which a speed (km/h) causing the trouble and a time (minutes) elapsed up to such a speed are measured to obtain results shown in Tables 1 and 2.

As seen from Table 1 showing the examples and Table 2 showing the comparative examples, the high-speed durability is very excellent in the pneumatic radial tires according to the invention.

As shown in the results of the comparative examples in Table 2, when the values of the twisting number, end count of the cords and the like in the belt reinforcing layer are the same as in the example and well-known from the old time, if the cord does not satisfy the twisting coefficient and/or residual tension per unit width as defined in the invention, the tire after the vulcanization is deformed and cannot be put into practical use, or high-speed durability of the tire is poor.

Example II

A pneumatic radial tire used in Example II has a tubeless structure having a tire size of 205/60R15, in which structures of a carcass and a belt layer are as follows:
Carcass: The material of the carcass is polyethylene terephthalate (PET), and the structure and number of the cord are 1000 denier/2 and 2 plies, respectively.
Belt layer: two separated layer structure of steel cords and added with a belt reinforcing layer having a given structure.

The test results of examples and comparative examples obtained by using the above pneumatic radial tire are shown in Tables 3 and 4.

Moreover, symbol in parenthesis in column of "Structure of belt reinforcing layer" in Tables 3 and 4 corresponds to the structure of the belt reinforcing layer shown in FIGS. 4A–4C showing an outline view of the belt reinforcing layer.

TABLE 3

|  | Example 1 | Example 2 | Example 3 | Example 4 |
|---|---|---|---|---|
| Structure of belt reinforcing layer | A | B | C | B |
| cap number | 1 | 1 | 1 | 1 |
| layer number | 2 | 1 | none | 1 |
| Material of belt reinforcing layer | 66-nylon | 66-nylon | 66-nylon | PET |
| cord structure | 840d/2 | 1260d/2 | 1890d/2 | 1500d/2 |
| total denier of cord | 1680 | 2520 | 3780 | 3000 |
| Twisting coefficient ($N_t$) | 0.07 | 0.23 | 0.25 | 0.18 |
| Cord occupying ratio (%) | 60 | 50 | 48 | 27 |
| Steering Index | 115 | 120 | 110 | 110 |
| High-speed durability (km/h) | 270 | 270 | 260 | 260 |
| Trouble form | blowout of shoulder portion | blowout of shoulder portion | blowout of shoulder portion | blowout of shoulder portion |

TABLE 4

|  | Comparative Example 1 | Comparative Example 2 | Comparative Example 3 | Comparative Example 4 |
|---|---|---|---|---|
| Structure of belt reinforcing layer | A | B | B | B |
| cap number | 1 | 1 | 1 | 1 |
| layer number | 2 | 1 | 1 | 1 |
| Material of belt reinforcing layer | 66-nylon | 66-nylon | 66-nylon | PET |
| cord structure | 420d/2 | 1260d/2 | 1260d/2 | 1890d/2 |
| total denier of cord | 840 | 2520 | 2520 | 5670 |
| Twisting coefficient ($N_t$) | 0.19 | 0.68 | 0.23 | 0.25 |
| Cord occupying ratio (%) | 56 | 50 | 75 | 63 |
| Steering Index | 95 | 100 | 100 | 100 |
| High-speed durability (km/h) | 230 | 240 | 200 | 230 |
| Trouble form | separation at shoulder portion, cord breakage | separation at shoulder portion | separation at shoulder portion | separation at shoulder portion |

The test methods for the steering index and high-speed durability described in Tables 3 and 4 are as follows.

Steering Index

The steering stability is evaluated by a feeling test and represented by an index on the basis that the control tire is 100. The larger the index value, the better the steering stability.

High-Speed Durability

The test for the high-speed durability is carried out by increasing a speed from 120 km/h at a rate of 10 km/h every 30 minutes until the occurrence of trouble. In Tables 3 and 4 are shown a speed at the occurrence of trouble and a trouble form.

In all examples and comparative examples, the belt structure of the belt portion is comprised of two belt layers 5 as shown in FIGS. 3 and 4A–4C, and "cap number" in the column of "structure of belt reinforcing layer" of Tables 3 and 4 is a layer number of the belt reinforcing layer (cap) 7 covering substantially the full width of the belt layer 5 as shown in FIGS. 3 and 4A–4C, and "layer number" is a layer number of belt reinforcing layer (layer) 6 arranged in the vicinity of both end portions of the belt layer 5 as shown in FIGS. 3 and 4A–4C (the layer number of the layer arranged on both end portions of the belt layer 5 is same and shows a layer number of the layer at one end portion but does not show the total layer number at both end portions).

As shown in Table 3, the tires of Examples 1–4 is large in the steering index as compared with those of Comparative Examples 1–4 shown in Table 4, which shows a considerable improvement of steering stability. Furthermore, high-speed durability is largely improved in the tires of Examples 1–4 and also the failure mode of the tire is not a dangerous separation but is a blowout of shoulder portion, which is entirely different from those of Comparative Examples 1–4.

Particularly, Example 2 and Comparative Example 2 are the same other than the twisting coefficient $N_t$. In Comparative Example 2, the twisting coefficient $N_t$ is 0.68 outside the range defined in the invention, so that the steering stability and high-speed durability are considerably degraded as compared with those of Example 2.

The invention can effectively control the size growth of the tire in the radial direction during high-speed running and has no problem such as poor processability of cord, tire deformation, cord breakage, zigzag movement and poor heat-resistant adhesion property, so that the high-speed durability can be improved without sacrificing various performances of the tire.

I claim:

1. A pneumatic radial tire comprising; a carcass made of a ply of radially arranged cords toroidally extending between a pair of bead portions, a belt arranged outside the carcass in a radial direction of the tire, and a belt reinforcing layer of organic fiber cords arranged outside the belt in the radial direction of the tire, wherein the organic fiber cord constituting the belt reinforcing layer has a strand construction and a twisting coefficient $N_t$ in the range of 0.06–0.30 defined according to the equation:

$$N_t = T \times (0.139 \times D/2 \; \rho)^{1/2} \times 10^{-3}$$

wherein

T=twisting number in turns per 10 cm,

D=total denier, and $\rho$=specific gravity in grams per cm$^3$, and wherein the organic fiber cords are arranged in the belt reinforcing layer so that a residual tension $F_w$ per unit width of the belt reinforcing layer defined by the following equation is in the range of 80–400 kgf:

$$F_w = F \times E \times \text{number of belt reinforcing members},$$

wherein

F=residual tension per one cord in a belt reinforcing layer at a belt edge portion immediately after the taking out from the tire, and E=end count of cords in a belt reinforcing layer at a belt edge portion per 5 cm in a widthwise direction of the tire.

2. A pneumatic radial tire according to claim 1, wherein the belt reinforcing layer has a cord occupying ratio defined by (D×C)÷50×100 of not more than 65%, where D is the cord diameter in mm and C is the cord end count per 5 cm.

3. A pneumatic radial tire according to claim 1, wherein the organic fiber cord constituting the belt reinforcing layer has a total denier in the range of 1500–4000.

4. A pneumatic radial tire according to claim 1 wherein said residual tension Fw is in the range of 100–300 kgf.

* * * * *